April 7, 1959 R. C. RUSSELL 2,881,378
CIRCUIT APPARATUS FOR ELECTRIC WINDOW LIFTS
Filed May 19, 1955
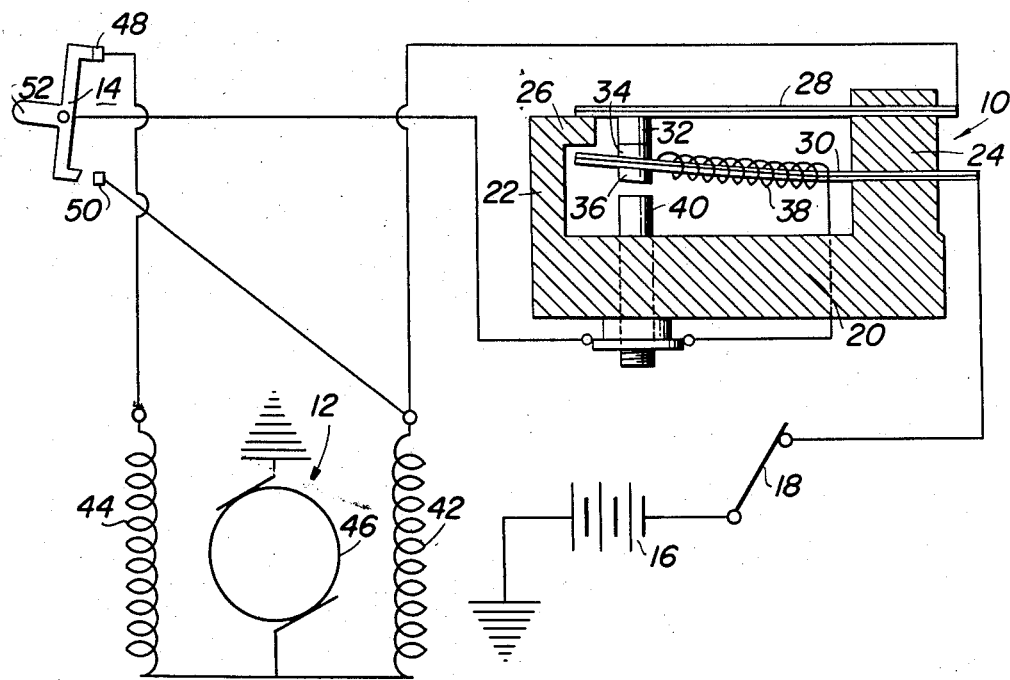
INVENTOR.
ROBERT C. RUSSELL
BY McDonald & Feagro
ATTORNEYS United States Patent Office 2,881,378
Patented Apr. 7, 1959

2,881,378

CIRCUIT APPARATUS FOR ELECTRIC WINDOW LIFTS

Robert C. Russell, Shaker Heights, Ohio, assignor to Eaton Manufacturing Company, Cleveland, Ohio, a corporation of Ohio Application May 19, 1955, Serial No. 509,498

4 Claims. (Cl. 318—283)

This invention relates to a circuit apparatus for electric window lifts and more particularly to a motor control circuit adapted to provide motor reversals in response to overloads imposed on the motor.

Broadly this invention comprehends the provision of a window actuating mechanism having a motor and a control circuit apparatus for the motor incorporating, among other features, a pair of bi-metallic strips of material responsive to the intensity of current flow to the motor for selectively providing forward or reverse rotation under normal conditions of operation and to sequentially, interrupt electrical conduction to the motor, to stall the same, reverse rotation of the motor and finally to stall the same again under abnormal or overload conditions of operation.

Many circuits are known for protecting against or mitigating the effects of abnormal or overload conditions, by interrupting or reducing the motivating force applied to a movable component. This invention, however, is more commodious than prior circuits in that in addition to accomplishing the above mentioned feature, provision is made for automatically reversing the motivating force for the purpose of retracting or withdrawing the movable component to prevent or reduce any damage thereto or to any element impeding the motion thereof.

To illustrate a practical example of the adaptation of such a feature it is noted that occasions arise wherein members of the human body may accidently or otherwise be interposed in the path of movement of a power operated window so as to become "stuck" while the actuating switch is retained in a position to urge movement of the window against the part of the body that is "stuck." It is readily understood that removal of the motivating force under the circumstances is insufficient to extricate the body member but that retraction or reverse movement of the window is required. Accordingly, this invention is ideally adapted to perform this safety function.

It is an object of this invention to provide a novel control circuit for window lift motors that is simple economical and effective to perform the functions to which adapted.

It is a further object of this invention to provide a novel control circuit for window lift motors that incorporates safety features to prevent objects from becoming "stuck" by the window.

It is a further object of this invention to provide a motor control circuit that is effective to sequentially momentarily interrupt energization of the motor, reverse rotation of the motor and interrupt rotation of the motor, all in response to an overload applied to the motor.

Other and further objects and advantages of this invention will appear from a detailed description of the invention taken with the accompanying drawings in which:

The single figure of the drawing shows the invention as applied to a reversible split series field motor.

Referring now more particularly to Fig. 1 of the drawing for a more detailed description of this invention 10 represents generally an overload circuit breaker of this invention, 12 represents a motor, 14 a motor actuator switch, 16 a source of direct voltage and 18 a master switch for the window lift mechanism which may simultaneously be an automobile ignition switch. Motor 12 is operable in two directions of rotation, i.e., it is reversible, to drive a window (not shown) in either of two directions.

Circuit breaker 10 comprises a mounting base having an elongated horizontal portion 20 and a pair of vertical portions 22 and 24. Portion 22 terminates at its end remote from portion 20 in a lip 26 provided for a purpose to be described. A pair of spaced bimetallic strips 28 and 30 are secured by portion 24. Strip 28 extends from portion 24 to a point above and beyond lip 26 as shown in the drawing and has a contact terminal 32 near one end. Lip 26 limits the downward movement of the strip as shown in the drawing. Strip 30 extends below and beyond lip 26 and is limited in upward movement by lip 26 as shown in the drawing. Strip 30 has a pair of opposed contacts 34 and 36 near one end and in alignment with contact 32 and has a resistance heating wire 38 wound about and attached at one end to strip 30. A fixed contact terminal 40 secured to portion 20 has connected to its lower extremity, the other end of wire 38.

Motor 12 is provided with a pair of field windings 42 and 44 joined at one end and an armature winding represented by 46 in the drawing.

Switch 14 comprises a pair of fixed contacts 48 and 50 and a pivoted arm 52 for selective contact with either of said fixed contacts.

Conductive connections are made to provide a series connection between simulated ground, battery 16, switch 18 and strip 30. Connections are also made between strip 28 and the free end of coil 42, between contact 40 and pivotal arm 52 and from contacts 48 and 50 to free ends of coils 44 and 42, respectively.

In operation strips 28 and 30 are normally in rest positions against lip 26 and contact 40, respectively, and arm 52 assumes a position intermediate the contacts 48 and 50. It is assumed that switch 18 is closed and that it is desired to raise the window (not shown) by the motor 12. Arm 52 is deflected to engage contact 48 whereupon a closed circuit is effected by way of battery 16, switch 18, strip 30, contacts 36 and 40, arm 52, contact 48, coil 44, armature 46 and ground. Motor 12 is, accordingly, energized for rotation to raise the window. To lower the window switch arm is deflected to engage contact 50 and effect a closed circuit through elements from ground to switch arm 52 as described above, and thereafter through field coil 42 and armature 46. Since the flux engendered by coil 42 is in a reverse sense to that from coil 44 and since current direction in armature 46 remains the same, motor 12 reverses to lower the window. It is noted that a parallel path from strip 30 to contact 40 is provided under the circumstances through coil 38 but because of its relatively high resistance as compared with that of strip 30 its conduction is small and its presence accordingly insignificant. It is also noted that under normal circumstances the current drawn by motor 12 is insufficient to materially raise the temperature of strip 30.

It is next assumed that it is desired to raise the window and that either some obstruction impedes motion of the window or that it has reached its upper limit while the switch arm 52 is retained in position to urge elevation of the window. Under such circumstances motor 12 conducts heavily due to the heavy overload imposed thereon and strip 30 also conducts heavily since motor current traverses it. As a consequence the temperature of strip 30 is increased with the result that strip 30 bends or warps so as to disconnect contacts 36 and 40 from each other. This effects a virtual "open" in the motor circuit since under this condition motor current passes from strip 30 through high resistance wire 38 to contact 40 rather than through contact 36 to contact 40. Motor 12, accordingly, stops and consequently the force of the window against the obstruction is removed. Under the circumstances virtually full battery voltage is applied to the ends of wire 38 and its temperature rises rapidly with the result that strip 30 in close proximity to wire 38 is heated rapidly. Consequently the bending of strip 30 is accelerated since current through wire 38 engenders considerably more heat than current through strip 30 alone. This condition continues until contact 34 on strip 30 quickly engages contact 32 on strip 28 whereupon a relatively low resistance circuit is provided from strip 30, through contacts 34, 32, strip 28, coil 42, to armature 46. Since coil 42, rather than coil 44, is now energized the rotation of motor 12 is reversed to lower the window and facilitate removal of the obstruction.

In the event that arm 52 is still retained in engagement with contact 48 after automatic reversal of motor 12 as just described, heavy current will again be drawn by motor 12 through both strips 30 and 28 and the contacts 34 and 32. Strip 28 will also be responsive to heavy conduction and the heat produced thereby to bend or warp in a direction to remove contact 32 from engagement with contact 34 since the upward movement of strip 30 is limited by lip 26. The result of disengagement of contacts 34 and 32 is to disconnect motor 12 from its energy source and to consequently stop the motor. With still further retention of switch arm 52 in engagement with contact 48, strip 28 will vibrate between engagement of contacts 34 and 32 and disengagement therebetween since strip 28 cools more rapidly than arm 30. Consequently motor 12 will be intermittently energized rather than constantly so energized to provide overload protection therefor.

It is also clear that the circuit breaker of the present invention is effective to provide overload protection in the lowering of the window in a slightly different manner from that described above with respect to window elevation. In the event that switch arm 52 is retained in engagement with contact 50 after the window has reached its lower extremity or if some obstruction impedes lowering of the window, strip 30 is responsive as above described to disconnect motor 12 from energization. Thereafter, however, the sequence of events differs from that above described in that strip 30 upon sufficient bending contacts strip 28 to re-energize motor 12 for providing torque in the original sense rather than in a reverse sense. Under these circumstances strip 28 again bends away from lip 26 to remove engagement between contacts 34 and 32 to again deenergize motor 12. Vibration of strip 28 again takes place after the second deenergization of motor 12.

From the foregoing description it is clear that the present invention is simple and effective in providing overload protection to a motor circuit as, for example, as applied to a window lift mechanism, for preventing damage to the motor and associated window lift mechanism and to any obstruction impeding motion of the window. In addition, the invention is an effective safety device for preventing or minimizing damage or harm to members of the human body that may become interposed and "stuck" in the path of a power driven elevating window. The invention is effective to quickly stop the force of the window against the body member and quickly thereafter to reverse the motion of the window to permit removal thereof, thereby minimizing the damage thereto.

While the present invention has been described with reference to a certain specific embodiment and combined with certain specific apparatus as, for example, a split wound series motor, it is readily apparent to those skilled in the art that many variations and modifications can be made in the invention without deviating from the spirit or scope thereof. As an example, many other motors such as shunt wound motors may readily be controlled by the present invention. It is, accordingly, intended to cover all such variations and modifications in the appended claims.

What I claim is:

1. An overload circuit breaker and reversing apparatus comprising a pair of spaced bimetallic strips, a first of said strips having secured thereto a contact terminal, a second of said strips having secured thereto a pair of opposed contact terminals in alignment with said terminal on said first strip, a stop located between said strips for limiting movement of said strips toward each other, the contact terminal of said first strip being engageable with a contact terminal of said second strip, a fixed contact terminal in alignment with said contact terminals, one of said contact terminals secured to said second strip being normally in contact with said fixed contact terminal, a resistance heating element attached at one end to said second strip and at the other end to said fixed contact.

2. In combination, a reversible series motor having a pair of field windings and an armature winding, a first end of each of said windings being conductively connected at a juncture, a circuit breaker and motor reversing apparatus including a pair of heat responsive bimetallic strips and a fixed contact terminal, a source of electrical energy connected between ground and a first of said bimetallic strips, switch means for selectively connecting said fixed contact terminal to the second end of a first of said field windings, or to the second end of the second of said field windings, means connecting the second of said strips to the second end of the second of said field windings, the other terminal of said source being conductively connected to an end of said armature winding removed from said juncture, said first strip normally contacting said fixed contact terminal, means limiting the movement of said first strip in a direction away from said fixed contact terminal and for limiting the movement of said second strip toward said fixed contact terminal, said strips being engageable when simultaneously in said limiting position, a heating element connected between said first strip and said fixed contact terminal, whereby said first terminal is responsive to overload motor current to bend away from said fixed contact terminal to effectively deenergize said motor and to bend under the accelerating influence of said heating element into contact with said second strip to reverse rotation of said motor when said switch is retained in closed position to energize said first field winding.

3. In combination an overload circuit breaker and reversing apparatus and a reversible motor having forward and reverse windings comprising first and second spaced bimetallic strips, a fixed contact terminal normally engaging the first of said strips, said first strip being responsive to heat to bend away from contact with said fixed contact terminal and toward said second strip in a first direction, means limiting the bending of said first strip in said first direction and the bending of said second strip in a direction reverse to said first direction, said strips being in engagement when simultaneously in a limiting position, determined by said limiting means, heating means connected across said first strip and said fixed contact terminal, said second strip being bendable away from said limiting position and contact with said first strip in response to heat, means providing conduction of current for said forward motor winding through said first strip and said fixed contact terminal under normal conditions and means providing conduction of current for said reverse motor winding through said first and second strips when simultaneously in said limiting position, said strips, being responsive to currents therethrough to engender heat and bend said strips whereby said first strip is operative sequentially to disengage said fixed terminal in response to overload motor currents, effectively connect said heating element across said first strip and said fixed contact terminal, and to contact said second strip in said limiting position and said second strip is operative thereafter to intermittently engage and disengage said first strip at said limiting position.

4. An overload circuit breaker and reversing apparatus comprising a pair of spaced bimetallic strips each having one end portion thereof secured to a base, a fixed contact terminal adjacent the other end portions of said strips, a first of said strips having a contact terminal secured thereto, a second of said strips having a pair of opposed contact terminals disposed thereon in alignment with the terminal on said first strip and said fixed terminal, one of the terminals of said pair being engageable with the terminal on said first strip, means for connecting a power source to said second strip adjacent the fixed end portion thereof, a resistance heating element operatively attached at one end thereof to said second strip and at the other end to said fixed terminal, the other of the terminals of said pair being normally in contact with said fixed terminal so that current flows through said second strip and across the said other terminal of said pair and said fixed terminal, the said other terminal of said pair being movable out of the normal contact with the fixed terminal so that current flows only through the second strip and the resistance heating element and heats the second strip to bring the said one terminal of said pair into engagement with the terminal on said first strip.

References Cited in the file of this patent

UNITED STATES PATENTS

| | | |
|---|---|---|
| 2,352,713 | Hodgkins | July 4, 1944 |
| 2,366,387 | Crise | Jan. 2, 1945 |